United States Patent [19]

Marouf et al.

[11] Patent Number: 4,475,190
[45] Date of Patent: Oct. 2, 1984

[54] METHOD AND APPARATUS FOR CONTROLLING PORTS IN A DIGITAL CONFERENCE ARRANGEMENT

[75] Inventors: Mohamed A. Marouf; Paul W. Vancil, both of Lisle, Ill.

[73] Assignee: AT&T Bell Laboratories, Murray Hill, N.J.

[21] Appl. No.: 382,672

[22] Filed: May 27, 1982

[51] Int. Cl.³ .................. H04M 3/56; H04Q 11/04
[52] U.S. Cl. ............................ 370/62; 179/18 BC
[58] Field of Search ............. 370/62; 179/18 BC; 340/825.5

[56] References Cited

U.S. PATENT DOCUMENTS

| | | | |
|---|---|---|---|
| 3,699,264 | 10/1972 | Pitroda et al. | 179/18 BC |
| 3,937,898 | 2/1976 | Presto et al. | 179/18 BC |
| 4,022,981 | 5/1977 | McLaughlin et al. | 179/18 BC |
| 4,076,966 | 2/1978 | Bovo et al. | 370/62 |
| 4,175,215 | 11/1979 | McLaughlin et al. | 370/62 |
| 4,257,120 | 3/1981 | Funderburk et al. | 179/18 BC |
| 4,342,111 | 7/1982 | Busson | 370/62 |
| 4,389,720 | 6/1983 | Baxter et al. | 370/62 |
| 4,423,384 | 12/1983 | DeBock | 340/825.51 |

OTHER PUBLICATIONS

"Digital Conferencing Methods Enhance Speech-Comm Networks", W. F. Meeker, J. R. Richards, A. L. Nelson, EDN, Mar. 5, 1980, pp. 125-131.

Primary Examiner—Douglas W. Olms
Assistant Examiner—Wellington Chin
Attorney, Agent, or Firm—R. J. Godlewski

[57] ABSTRACT

For use in multiport digital conference arrangements wherein the speech samples of selected speakers are included in an output sample for distribution to the conferees, the disclosed arrangement features a speech detector for each port and processor-controlled switching hardware. By evaluating the conferee's speech level, the current state of the port, and other factors, each conferee is dynamically assigned an adjusted priority by a conference processing program. The speech samples of only the highest priority conferees are summed to control noise level, singing caused by echo, and other types of distortion.

13 Claims, 17 Drawing Figures

SORT ARRAY

| | | | |
|---|---|---|---|
| TOP | apl (1) | PORT # (1) | ⟹ apr = 1 |
| | apl (2) | PORT # (2) | ⟹ apr = 2 |
| | apl (3) | PORT # (3) | ⟹ apr = 3 |
| | apl (4) | PORT # (4) | ⟹ apr = 4 |
| BOTTOM | apl (5) | PORT # (5) | ⟹ apr = 5 |

EXEMPLARY APL CONSTANTS

METHOD AND APPARATUS FOR CONTROLLING PORTS IN A DIGITAL CONFERENCE ARRANGEMENT

TECHNICAL FIELD

This invention relates generally to multiport digital conference arrangements for including information samples received from the ports in an output sample and, more particularly, to method and apparatus for controlling the ports to improve the quality of transmission.

BACKGROUND OF THE INVENTION

Generally, digital conference arrangements combine information samples such as, for example, a speech sample from each conference port during some time period, and then distribute the resulting sample to each conferee. In a teleconference the communication between conferees should sound like a typical two-party connection; however, this is usually not the case when the participants communicate with each other over various types of transmission facilities which introduce irregularities such as, for example, noise, echo, and other types of distortion. For example, participants commonly access a conference via a telephone line which forms one two-way communication path. A digital conference circuit, however, requires two one-way communication paths. The transition between these two types of paths is usually made by a hybrid circuit which causes signal reflections, perceived as echo, on the lines. When the conferees are closely located, this echo is usually not objectionable to the listener. However, automatic gain control circuits, which adjust the speech level of a participant, amplify the echo and may cause the arrangement to emit a high-pitched tone particularly when there are multiple feedback paths due to several conferees being allowed to speak simultaneously. This high-pitched tone called singing, is quite annoying to the participants and prevents further conversation on the arrangement.

One of the more common ways to minimize echo and singing is to allow only one conferee to speak at any given time. This can be accomplished on a first-come, first-serve basis or by using the highest level of speech to control which conferee is heard. Both arrangements have disadvantages in that each allows one speaker to dominate the conference. Also, in the latter case, sudden loud bursts of conversation from others or noise, such as the rustling of papers can break up the current speaker's conversation, thereby losing intelligibility. Furthermore, since the speech level of each participant is a function of distance and equipment, some participants may never get to speak on the arrangement at all.

In contrast to the one speaker arrangements, there are those systems which allow all of the conferees to speak simultaneously. These conference circuits usually involve inserting loss in the receive path of each conferee or speaker. As a result, the amount of feedback as well as the speech level to each conferee is reduced. If automatic gain control is employed to boost the speech level of each speaker, the probability of singing increases, and as a result, additional loss must be inserted. Other arrangements which permit simultaneous speakers disconnect the transmit path of each conferee until the conferee's speech level reaches a threshold. While this approach eliminates a feedback path when a conferee is silent it still may cause singing if too many conferees speak simultaneously.

SUMMARY OF THE INVENTION

The foregoing problem is solved and a technical advance is achieved in a multiport digital conference arrangement by method and apparatus for selecting ports from which an information sample from each selected port is included in an output sample for distribution to the conferees. This is accomplished by detecting the state of each conference port in each one of at least two pluralities of states, assigning a priority level to each port based on the state of the port in each of the two pluralities of states, and including in the output sample the information sample of only the ports having predetermined priority levels.

More specifically, in one illustrative embodiment of the invention, a port is assigned a first priority based on the level of speech detected on the port. In addition, each port is assigned a second priority based on the speakers current activity on the port such as how long the speaker was silent, how long the speaker talked, the interval between speech bursts, etc. The two priorities assigned to a port are then combined to give the port an overall priority to determine whether the speech sample from the port should be included in the output sample.

In accordance with one feature of the invention, the number of samples to be included in the output sample can be selectively varied up to a maximum number.

BRIEF DESCRIPTION OF THE DRAWING

The invention may be better understood from the following detailed description when read with reference to the drawing in which.

DETAILED DESCRIPTION

INTRODUCTION

Figure 1:
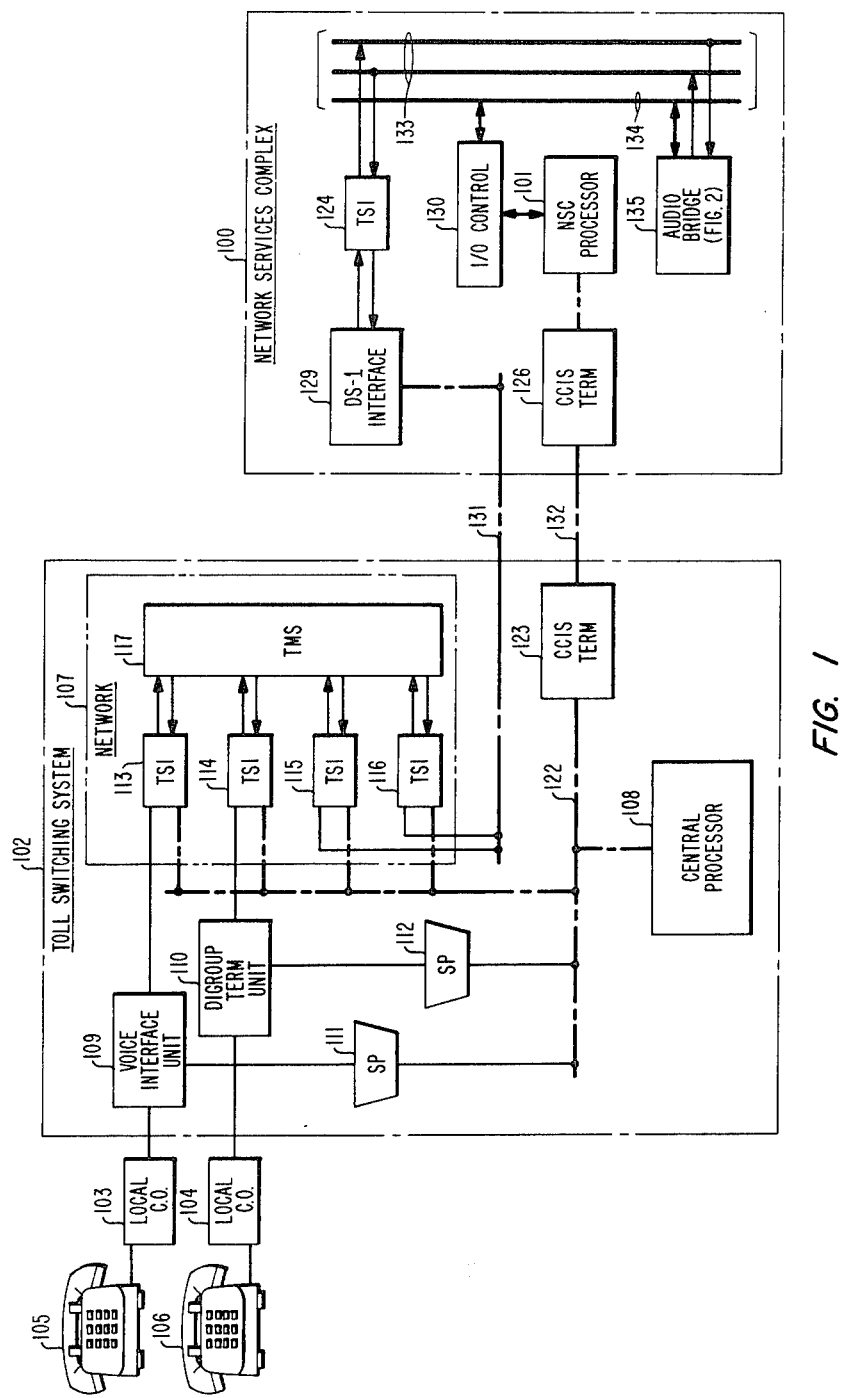
FIG. 1 shows a block diagram of a telephone network having a toll switching system equipped with a network services complex (NSC) for providing audio conferencing and other services.

The general organization of a system employing the invention is illustrated in the block diagram of FIG. 1 which shows a typical communications network having a toll switching system 102 which serves local central offices 103 and 104. Central offices 103 and 104 contain switching apparatus for providing communication services to customer stations 105 and 106, respectively. Connected to switching system 102 is network services complex 100 for providing special services such as audio and data conferencing.

Network services complex 100 includes NSC processor 101, audio bridge 135, and other units. As will be described in more detail below, one of the functions of the complex is to provide facilities for conferencing the voice signals of customers over the telephone network via the toll and local switching offices.

Toll switching system 102, as depicted in FIG. 1, is a typical electronic switching system, such as, the No. 4 ESS which is manufactured by the Western Electric Company, Incorporated. This switching system is described in detail in the *The Bell System Technical Journal*, Vol. 56, No. 7, September, 1977, and need not be fully described herein for the reader to understand the present invention.

TOLL SWITCHING SYSTEM

Switching system 102 comprises network 107, central processor 108, voice interface unit 109, digroup terminal unit 110, signal processors 111 and 112 and miscellaneous equipment units that have not been shown to simplify the drawing.

Network 107 has a time-space-time switching configuration utilizing time slot interchange (TSI) units 113–116 and time multiplex switch (TMS) unit 117.

Time multiplex switch 117 is a two-stage switch array comprised of solid state crosspoints which provide a multiplicity of unidirectional paths between its inputs and outputs. Each network connection through TMS 117 is made in terms of a pair of unidirectional paths in one of the 128 time slots sharing the paths on a repeating basis at an 8 KHz rate. The switches are controlled by information contained in time slot memories and this information is placed in the memory by the central processor under the control of call processing programs.

Time slot interchange units 113–116 provide the initial time-space and final space-time stages of network 107. The units receive incoming pulse code modulated (PCM) samples over analog and digital facilities in well-known DS-120 format where 120, eight-bit PCM channels are time division multiplexed with eight maintenance channels to form a 128 time slot frame. The receiving portion of a TSI unit buffers the incoming links to allow synchronization of the data with network timing and performs the initial time-space switching before transmitting the data to the TMS. After passing through the TMS, the data is returned to the same TSI or another TSI where the final space-to-time conversion is performed. The TSI then reloads the data onto outgoing DS-120 links where it is transmitted to the appropriate analog or digital facility.

Access to switching network 107 is via serial PCM links each accommodating 120 voice channels. However, central offices 103 and 104 can be connected to toll switching system 102 via analog or digital transmission facilities. Thus, as seen in FIG. 1, local central office 104 is connected to the toll office over digital facilities which terminate in digroup terminal unit 110, whereas local office 103 is connected via analog trunks to voice interface unit 109. Digroup terminal 110 performs the time division multiplexing and demultiplexing between interoffice transmission facilities and network 107 and also processes control signals from signaling processor 112.

The analog trunks are terminated in a voice interface unit such as 109 whose principal function is analog-to-digital conversion (and vice-versa) plus formating digital data for the TSI units. Voice interface unit 109 communicates with the central processor via signal processor 111.

Signal processor 111 is a directed processor under the control of central processor 108 and provides the scan, distribute, and digit reception tasks for analog trunks. Signal processor 112 performs the equivalent tasks for the digital trunks except that instead of physical scan and distribution points, the supervisory states of each trunk are stored in a memory of the signal processor.

The majority of the logic, control, storage, and translation functions required for the operation of the toll switching system are performed by central processor 108. A typical central processor suitable for use in the illustrative toll switching system is described in the *Bell System Technical Journal*, Vol. 56, No. 2, February, 1977.

As mentioned above, interoffice signaling information is extracted from the transmission paths of analog and digital trunks by signal processors 111 and 112, respectively, and used by central processor 108 for call processing. However, the signaling for certain trunks may be transmitted between the offices over a common data link separate from the transmission paths using a common channel interoffice signaling (CCIS) system. A typical common channel interoffice signaling system is described in *The Bell System Technical Journal*, Vol. 57, No. 2, dated February, 1978, and is depicted in FIG. 1 by CCIS terminal blocks 123 and 126 and data link 132.

NETWORK SERVICES COMPLEX

Coupled to the toll switching system is network services complex 100 comprising NSC processor 101, time slot interchange unit 124, DS-1 interface 129, input/output control 130, and audio bridge 135. Network services complex 100 also includes other units such as a data conferencing facility, dual tone multifrequency receivers, and data storage which have not been shown to simplify the drawing and which need not be fully described herein for the reader to understand the present invention.

It is intended that network services complex 100 function with many different types of switching systems to provide several special services in addition to those mentioned above. As such, complex 100 has been designed to connect to a switching system via conventional interoffice trunks and a CCIS data link. Interoffice trunks 131 serving complex 100 are digital facilities similar, such as, for example, well-known T1 type, which are to the trunks between toll office 102 and local office 103 as described above, and data link 132 along with CCIS terminals 123 and 126 which are similar to those described in the 1978 *Bell System Technical Journal* cited above.

The network services complex is modularly designed to allow for various service units to be added. All units are interconnected over a time multiplex data bus 133 and a serial control bus 134. The control bus is used by NSC processor 101 via I/O control 130 to communicate control, status, and error information with the various units in the complex. Input/output control is a typical direct memory access circuit, whereas data bus 133 consists of a transmit and a receive leg, each handling 256 time slots of time-multiplexed PCM data.

Interface 129 connects interoffice trunks 131 from toll switching system 102 to time slot interchange unit 124 which switches any of the 128 or 256 time slots on the interoffice trunks and data bus 133, respectively.

The network services complex 100 is controlled by NSC processor 101 which performs all call processing, maintenance, fault recovery, diagnostics and audits for the entire complex. NSC processor 101 also interfaces with CCIS terminal 126 to transmit and receive messages from the host toll switching system 102.

As mentioned above, the network services conplex can be equipped to furnish many services. For this illustrative embodiment, the complex is equipped with an audio bridge 135 which will be used for establishing audio conferences under customer control.

THE AUDIO BRIDGE

Figure 2:
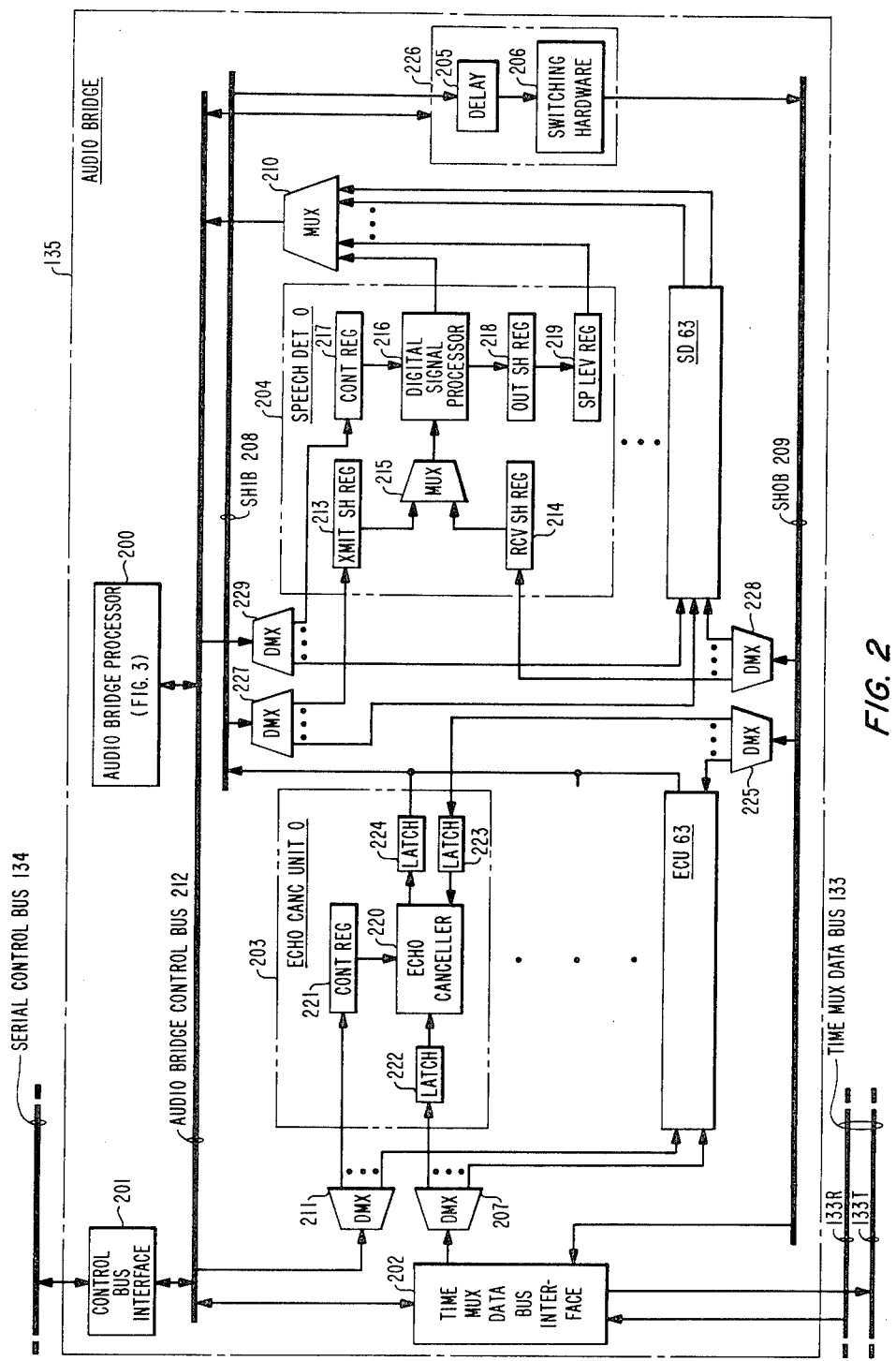
FIG. 2 shows a more detailed block diagram of the NSC audio bridge for providing autio conferences.

The audio bridge is a multiport digital conference arrangement and is illustrated in more detail in the block diagram of FIG. 2. The conference arrangement comprises an audio bridge processor 200, bus interfaces 201 and 202, a plurality of echo canceler units such as 203, a plurality of speech detectors such as 204, and logic unit 226 which includes delay unit 205 and switching hardware 206. A speech detector and an echo canceler are provided on a per-port basis to detect and measure the level of speech and to control the amount of echo, respectively. In this illustrative embodiment, 64 detectors and 64 echo cancelers have been provided to make up a 64 port (channel, time slot) audio bridge, but only 60 on an alternating basis will be available for conferencing, the others being used for spares and maintenance testing. Thus, the audio bridge can form conferences varying in size from one 60-port conference to 20 three-port conferences.

Each port is monitored for the presence of speech above a threshold level. Speech on a port is represented by a number of information samples, each sample being at one of a plurality of levels. The level of the samples on a port may be combined over some time period to form a level for comparison with the threshold. Or alternatively, the level of each sample may be compared with the threshold. Hence, for the purposes of this description, the presence of speech on a port may be represented interchangeably by a single threshold sample or combination of information samples. Upon detecting speech, the speech detector for that port generates two control signals. One is a speech indication which designates the port as having speech thereon, and the other is a speech level estimate which is used for port selection and automatic level control. The audio bridge processor scans the speech detectors once each base cycle for these control signals to direct the switching hardware to include only information samples from selected, designated ports in the output sample. Generally, with one conferee speaking, only the input sample from that speaker is included in the output sample. With more than one conferee speaking simultaneously, the switching hardware sums the input sample from each speaker together to form the output sample. To allow sufficient time for speech detection and port selection, the delay unit stores all incoming information samples for a period of time equal to the worst case speech detection and channel selection time. During one portion of this time period, the two control signals are generated. During a subsequent portion, the delay unit applies the stored information samples to the switching hardware for selective inclusion in an output sample.

Communication within the audio bridge between the audio bridge processor and other units is via audio bridge control bus 212. The audio bridge communicates with the rest of the network services complex, and, therefore, the telephone network via serial control bus 134 and time multiplex data bus 133. It is over serial control bus 134 that the audio bridge receives orders from and sends replies to NSC processor 101 for establishing and controlling conferences. Time multiplex data bus 133, on the other hand, comprises a transmit and a receive leg for handling the samples of speech to be summed and distributed for each conference.

AUDIO BRIDGE PROCESSOR

Audio bridge processor 200 is a well-known 16 bit, bit-sliced microprogrammed controller that performs all common arithmetic, logic, and sequence control operations found in comparable 16 bit microcomputers. The audio bridge processor communicates with the NSC processor via audio bridge control bus 212 and is programmed to scan the transmit and receiver buffers within serial control bus interface 201 for orders to control the conferences and to format replies to the NSC processor.

The audio bridge processor also controls the status of the conferences by writing control information into the switching hardware control memory. In addition, the processor also scans the speech detectors to obtain information about the speech level of every port of the conference, maps the speech level into gain control coefficients, and then writes these coefficients into the switching hardware coefficient memory for noise and automatic level control. Furthermore, processor 200 controls the operation of the echo canceler hardware by writing control data into the echo canceler control registers.

Figure 3:
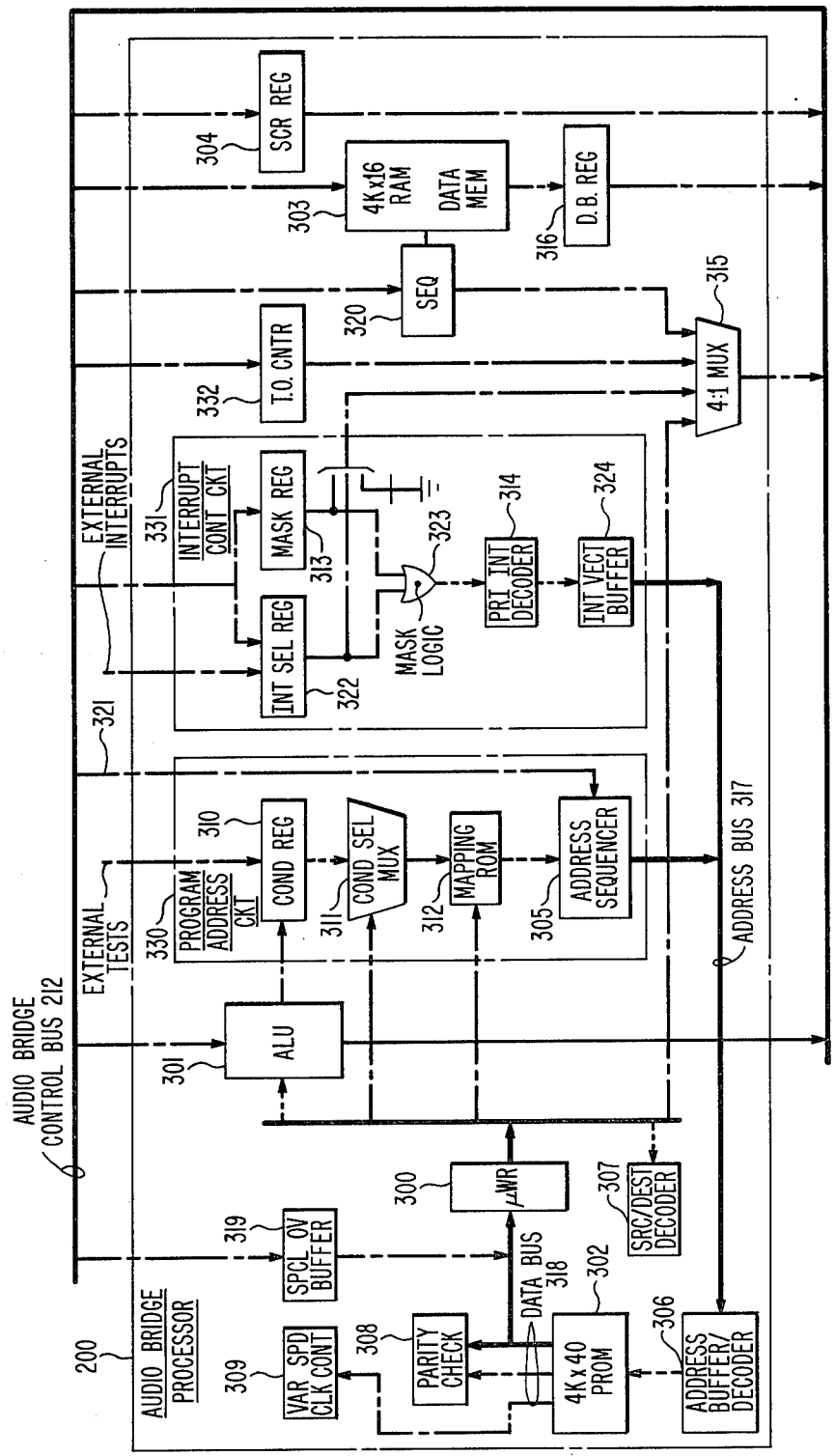
FIG. 3 shows a more detailed block diagram of the audio bridge processor for controlling the status of an audio conference.

Audio bridge processor 200 is disclosed in more detail in FIG. 3 and comprises a number of well-known processor and memory units which are commercially available. The basic units include microword data register 300, arithmetic logic unit 301, a program memory such as PROM 302, program address circuit 330, interrupt control circuit 331, and a data memory such as RAM 303. The audio bridge processor contains two internal buses, namely, address bus 317 and data bus 318. Access to the other units of the audio bridge, such as echo cancelers, speech detectors and the switching hardware, is via audio bridge control bus 212 which can also be used to transfer data to and from registers internal to the audio bridge processor.

The audio bridge is arranged so that various units within the bridge can act as sources and destinations for data on audio bridge control bus 212. Accordingly, each instruction specifies the source and destination address for data to be moved on the audio bridge control bus. Each address for program memory 302 is generated by program address circuit 330 and transmitted over internal address bus 317 to program memory 302 via address buffer/decoder 306.

Program address circuit 330 includes condition register 310, condition select multiplexer 311, mapping ROM 312, and address sequencer 305. The output of address sequencer 305 provides the address for program memory 302. In addition, the sequencer is directly connected to control bus 212 via conductors 321 to obtain addresses from any of the audio bridge registers that are acting as sources on the bus. Condition register 310 and multiplexer 311 are used to make conditional jumps which may be based on addresses applied to mapping ROM 312 from microword register 300.

Portions of the output of the program memory are then written into microword register 300, parity check circuit 308, and clock control circuit 309 via internal data bus 318. Microword data register 300 is a 32-bit latch that holds the instruction being executed. While the latched instruction is executed, a new instruction is fetched, thus permitting a pipelined architecture. Clock circuit 309 controls the number of clock cycles needed to execute the instruction by reading a field in the instruction. Parity of the instruction is calculated by parity check circuit 308. The instruction contained in microword data register 300 contains a source field, a destination field, and an overlay field. Interpretation of the overlay field depends on whether the instruction is for the arithmetic logic unit or the program address circuit. A special overlay buffer 319 is provided to allow words to be written into register 300 for diagnostic purposes.

The output of microword data register 300 is applied to arithmetic logic unit 301 and control bus source and destination register 307. Arithmetic logic unit 301 is capable of performing addition, subtraction, and other logical functions. Scratch-pad register 304 is also provided to conveniently move various types of data in arithmetic logic unit 301. Data bus source and destination register 307 decodes the source and destination address fields in the instruction to generate appropriate register input and output enable signals.

Data memory 303 in this embodiment is used as a temporary data store for the audio bridge processor and is controlled by sequencer 320 which permits the memory to act as both a data source and destination on control bus 212. To access the memory, address information from control bus 212 is first loaded into memory sequence 320. Data from the memory is then placed on the control bus via data buffer register 316.

Interrupt control circuit 331 is also provided in the audio bridge processor. The interrupt control circuit comprises select register 322, mask register 313, mask logic 323, priority interrupt encoder 314, and interrupt vector buffer 324. In this illustrative embodiment, up to seven levels of external user-divider interrupts and seven software interrupts have been provided. When the interrupt circuit acts as a destination on control bus 212, a portion of the data is written into select register 322 and the remaining portion is written into mask register 313. The software interrupt can then be executed by masking the output of the select register with the output of the mask register. The masked output is then encoded by priority interrupt encoder 314 which drives buffer 324, whose output accesses program memory 302.

Time-out counter 332 is provided to function as a sanity timer which generates interrupts via interrupt select register 322. In addition, multiplexer 315 provides a one out of four source selection to reduce loading on control bus 212 and allows the data memory sequencer, time-out counter, interrupt control circuit, and microword register direct access to the bus.

ECHO CANCELER

Returning to FIG. 2, the echo canceler units are provided on a per-port basis as mentioned above. Each unit comprises an echo canceler such as 220, a plurality of latches 222–224 for gating speech samples into and out of the echo canceler, and a control register 221 under the control of audio bridge processor 200. An example of an echo canceler suitable for use in the echo canceler unit is described in "A Single-Chip VLSI Echo Canceler", *Bell System Technical Journal*, Vol. 59, No. 2, February, 1980, pp. 149-160.

During its assigned time slot, the echo canceler receives a near-end speech sample from time multiplex data bus interface 202 via demultiplexer 207 and latch 222 and a far-end speech sample from the switching hardware via demultiplexer 225 and latch 223 in $\mu 255$ companded format. Echo canceler 220 computes the estimated echo and subtracts this from the near-end speech sample. The resultant is transmitted via latch 224 to switching hardware input bus 208. The speech samples from the switching hardware are transmitted to the time slot interchange unit via time multiplex data bus 133 and interface 202.

The transmit and receive legs of the time multiplexed data bus 133 pass 256 times slots of PCM audio data to and from time slot interchange unit 124. The audio bridge ports need only 64 time slots. The interface selects the 64 out of 256 time slots required for the audio bridge ports, formats the data, and generates timing signals for the echo cancelers, speech detectors, delay unit, and switching hardware.

SPEECH DETECTOR

Speech detector 204 comprises a digital signal processor 216, two input shift registers 213 and 214, an output shift register 218, and speech level register (latch) 219. The speech detector does not modify the flow of data from the echo cancelers to the switching hardware but merely monitors the data flow on both the input and output sides, i.e., buses 208 and 209, of switching hardware 206 via demultiplexer 227 and 228. This gives the audio bridge processor full control over the gain or loss modification of the audio data and also permits the bridge to operate with some or all of the speech detectors out of service.

The digital signal processor 216 receives a synchronization pulse in the time slot to which the speech detector is assigned, and upon receiving the pulse, the speech detector starts alternately reading data from the switching hardware input and output buses 208 and 209 via shift registers 213 and 214, respectively, and multiplexer 215. In executing its program, the digital signal processor transmits a speech level measurement to output shift register 218 and latch 219. Periodically, the audio bridge processor scans the digital signal processor for a speech indication and, if present, reads the speech level measurement from the latch. This data is then transmitted over control bus 212 via multiplexer 210 which buffers data from all the speech detectors.

The audio bridge processor controls the digital signal processor via control demultiplexer 229 and register 217. By setting register 217, the digital signal processor can be put in any one of a number of operational or maintenance modes.

An example of a digital signal processor suitable for use in the present invention is disclosed in the *Bell System Technical Journal*, Vol. 60, No. 7, Part 2, September, 1981.

SWITCHING HARDWARE

Switching hardware 206 performs three major functions in the conference arrangement, namely, it sums the speech samples from the time slots (ports, channels) into their respective conferences to form an output sample for each conferee, implements noise and automatic level control on incoming speech samples, and implements echo control by inserting loss into the speakers receive path when echo cancelers are not effective. The audio bridge processor controls these functions by writing the coefficient memory of the switching hardware with appropriate coefficients.

Insofar as the switching hardware is concerned, conference summation is a two-step process which occurs over two time frames, where a frame comprises a maximum of 64 audio bridge time slots. The mouth samples for a given time frame are first combined to form a sum for each conference. Then in the following time frame, an ear sample is produced for each conferee by subtracting the conferees mouth sample from the conference sum.

Figure 4:
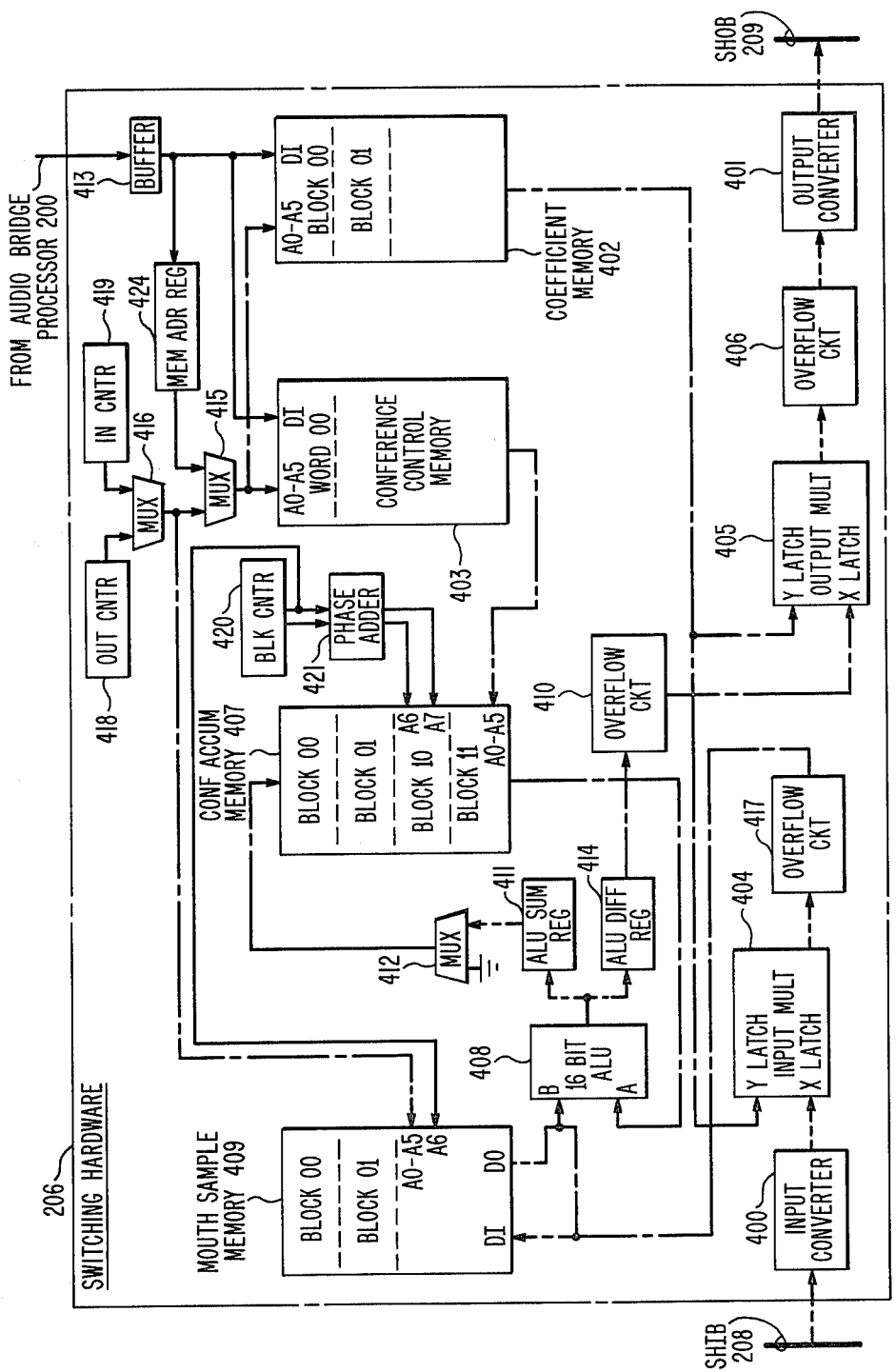
FIG. 4 shows a more detailed block diagram of the audio bridge switching hardware for including information samples from selected ports in an output sample.

The switching hardware used in this embodiment of the invention is shown in more detail in FIG. 4. The switching hardware receives the output of the echo cancelers via delay unit 205 over switching hardware input bus 208. Data is in the well-known $\mu 255$, eight-bit parallel format. This data is first converted to a 13-bit linear form by converter 400 using a table lookup operation, and the linear data is forwarded to input multiplier 404.

Input multiplier 404 implements the noise and automatic level control in the audio bridge. The two inputs to the multiplier are the linear mouth sample from converter 400 and a coefficient from coefficient memory 402 as determined by audio bridge processor 200. The determination of the coefficient to be applied to the incoming sample will be described below. When the coefficient is equal to zero because there is no talking on a conferee port, the background noise related to that time slot is eliminated.

To insure that both the multiplier and, indirectly, the coefficient are valid, overflow circuit 417 checks for products larger than can be allowed in the bridge. If an overflow condition is detected, the output is forced to a maximum level corresponding to the sign-bit of the output.

The output of the overflow circuit 417 is then applied to addition and subtraction hardware to produce the conference sums for each frame and the individual ear samples for each conferee. The addition and subtraction is performed by arithmetic logic unit 408 in cooperation with memories 403, 407, and 409. When producing the total conference sum, arithmetic logic unit 408 adds an adjusted mouth sample from input multiplier 404 to the partial sum of the conference which is an accumulation of mouth samples from all time slots in the current time frame for the particular conference. The partial sum is stored in accumulator memory 407 via sum register 411 and multiplexer 412.

To produce an ear sample for each conferee, the conferee's mouth sample from the previous frame is taken from memory 409 and subtracted from the total sum of all mouth samples from the same frame of the conference.

The conference accumulator from an operational point of view, contains two blocks of stored data, namely, the partial sum of mouth samples of the current frame and the total sum of all mouth samples received during the previous frame.

During the summing process, one additional block is used for an initialization process, while still another block remains idle.

The addressing of coefficient memory 402, control memory 403, accumulator 407, and mouth sample memory 409 is controlled by time slot and frame counter circuits. The blocks of data associated with each time slot in the memories are addressed by input and output time slot counters 418 and 419 via multiplexer 416. Since mouth sample memory contains two 64-word data blocks, frame counter 420 is used to address the desired block of data. With accumulator 407, phase adder 421 in response to the frame counter addresses one of four data blocks.

As noted above, the audio bridge processor controls each conference as to its membership and the number and level of enabled simultaneous speakers. The processor exercises this control through the use of control memory 403 and coefficient memory 402.

Control memory 403 consists of sixty-four words, each of which, is associated with a conference port, i.e., a time slot. The control memory is written by audio bridge processor 200, via buffer 413, memory address register 424, and multiplexer 415. Each word in the control memory contains the address of the conference accumulator memory location to which a conference is associated. Thus, whenever a time slot sample is added to a partial sum or subtracted from a total sum, the sample in accumulator 407 is pointed to by control memory 403.

Coefficient memory 402 contains two 64-word data blocks, one word per time slot. One word corresponds to the input coefficient for adjusting the speaker's sample, and the other is for adjusting the listener's sample that is transmitted to a conferee.

The output of arithmetic logic unit 408 that is to be transmitted to a conferee is transmitted via difference register 414 and overflow circuit 410 to output multiplier 405. Multiplier 405 adjusts the ear sample by the coefficient factor received from memory 402 to provide additional echo control. Similar to the input operation, overflow circuit 406 makes sure that the output level of the ear sample does not exceed a certain threshold, and the resultant is converted back to $\mu 255$ format by output circuit 401. The companded signal is transmitted over switching hardware output bus 209 via interface 202 to data bus 133. It is via this data bus and the NSC time slot interchange unit that the summed speech samples are distributed over the communication network to the conferees.

DELAY UNIT

Returning again to FIG. 2, delay unit 205 stores the information samples from all 64 ports for a period of time before the samples are applied to switching hardware 206. This provides enough time for the speech detectors to designate channels having threshold samples thereon and the audio bridge processor to select designated channels. If the delay unit is not utilized, the information samples would be applied directly to the switching hardware, and the loss of samples, commonly called clipping, would likely occur. When the samples respresent speech, this clipping may result in the loss of the initial syllable or even the entire first word of a new speaker. In order to minimize clipping, the delay time should be greater than the time required by the speech detector to detect the presence of speech and the audio bridge processor to select designated channels.

Figure 5:
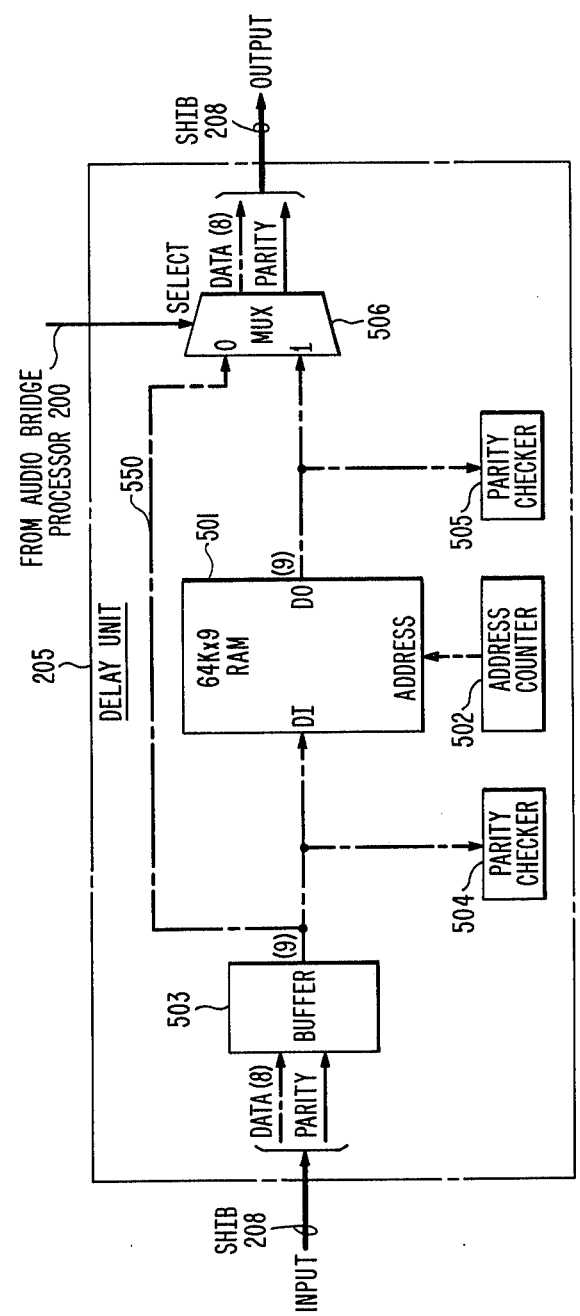
FIG. 5 shows a more detailed block diagram of the audio bridge delay unit for delaying the application of incoming information samples to the switching hardware.

The delay circuit used in this embodiment is depicted in more detail in FIG. 5 and basically comprises a delay memory such as RAM 501 and address counter 502. Delay memory 501 receives information samples from all 64 channels via switching hardware input bus 208 and input buffer 503. Each sample appears on the bus as eight parallel bits of PCM information during one time slot of a 64 time slot frame. In addition, a parity bit is provided with every input sample, and both are written into one location in delay memory 501 after parity is computed by input parity check circuit 504. During a subsequent time frame, the same sample and associated parity bit are read out during the same time slot the bits were written into memory. Parity is computed again for each sample by output parity circuit 505. During each of the 64 time slots, a read-write sequence is followed: reading old data out of a memory location, writing new data into the same location, and incrementing address counter 502.

One arrangement is to delay the sample a multiple of eight time frames where eight frames equals one millisecond of delay. Since there are 64 ports, it takes (8 times 64) 512 words of memory to delay a sample eight time frames. When, for example, the size of the delay memory is 64,024 words, the maximum delay is 127 milliseconds.

The length of delay can be controlled by adjusting the maximum value of the address counter. Since address counter 502 is incremented every time slot, the counter may be configured to cycle through 512 words of memory for one millisecond of delay. To provide k milliseconds of delay, the address counter is configured to cycle through k times 512 words of memory. If no delay is desired, a control signal from the audio bridge processor causes multiplexer 506 to select input samples directly from input buffer 503 via bypass bus 550.

To summarize, information samples from the channels are first stored in the delay memory during one time frame and then retrieved during a subsequent time frame for application to the switching hardware. This delay period allows the speech detectors and audio bridge processor sufficient time to detect the presence of speech and select designated ports from which the switching hardware will include input samples in an output sample. In one case, the input samples and the control signal are received by the switching hardware during the same time frame. Alternatively, the input samples may be delayed a longer period of time to permit the control signals to be first received by the switching hardware. This allows time for the switching hardware to adjust the selected ports before receiving the input samples to avoid clipping. Once samples are applied to the switching hardware, conference summation is then a two-step process which occurs over two time frames as previously described.

AUDIO DATA FLOW

Having described the bridge hardware, a brief description of the data flow through the bridge is in order. During each time frame, 64 time slots of PCM data enter the audio bridge via time-multiplexed data bus 133. Each time slot of data is first sent to an echo canceler such as 203 where various degrees of echo cancellation may be performed. The data leaves the echo canceler unit and is sent to delay unit 205 where it is delayed for a period of time sufficient for a speech detector such as 204 and audio bridge processor 200 to detect the presence of speech and to adjust the switching hardware to receive samples from selected ports. From the delay unit, the data is sent to the switching hardware which sums the incoming data and distributes the resulting combination to each port in a conference.

A speech detector for each of the 64 ports (time slots, channels) monitors the data going into the delay unit and generates a speech/no-speech (busy/idle) indication and a speech level estimate. An eight-bit number in a speech level register such as latch 219 represents the speech level estimate or, more particularly, the peak energy level over a period of time on the port, whereas, the digital signal processor generates the speech/no-speech indication. The audio bridge processor scans each speech detector every base cycle to obtain the speech/no-speech indication and the speech level estimate. These are then used by a conference processing program to select which ports of a conference are enabled on the bridge. Samples from an enabled port are included in the resulting output sample distributed to each port of the conference.

CONFERENCE PROCESSING PROGRAM

The conference processing program is part of the audio bridge processor firmware and software that utilizes priority levels to determine which ports in a conference are enabled on the bridge. To ensure the stability of the bridge, only a limited number of simultaneous speakers are enabled on the bridge. Thus, the program must sometimes select which active ports will be enabled. That is, which ports with speech on them will be heard by the conferees. A fundamental concern is that certain active ports should be enabled on the bridge easier than others. Appropriately, those ports should have a higher priority level than others. Hence, the priority level of each port is made a function of several pluralities or sets of states, such as, for example, the levels of speech on the port, the current port activity as well as the period of time the port has remained in that state, and an "assigned port priority". In addition, other sets of states devised by one skilled in the art may be used, such as the time of day, distance from the bridge, time zone, transmission facility type, etc.

Normally, the conferee who is currently speaking on an enabled port should have a higher priority level for staying enabled on the bridge than that of a conferee just beginning to talk. However, the conference processing program allows the speech level to adjust the priority level of active ports so that loud interrupting speakers may be heard on the bridge.

Current activity on the port is also used to adjust the priority level. Thus, a relative priority level is assigned to each one of a set of activity states. In addition, the state count—the number of base cycles a port remains in a given activity state—is used to adjust the priority level of each port.

Another factor in adjusting the port priority level is the "port priority" assigned by the NSC processor. When a port is added to a conference, the main processor may assign one of four port priorities: broadcast (BC), attendant (AT), normal (NORM), and listen-only (LO). The speech from a broadcast priority port is broadcasted to all other members of the conference. No other ports in the conference are enabled. A port with attendant priority is always enabled on the bridge when the port is active—that is, when the conferee is speaking. This guarantees that speech from the attendant port will always be heard by the other conferees. If the number of attendant priority ports is greater than the maximum number of permitted simultaneous speakers, then only the attendant ports with the highest priority levels will be enabled. A port with normal priority receives no special treatment. When a normal priority port is active, it is enabled as long as the maximum number of simultaneous speakers is not exceeded. A port with listen-only priority is never enabled on the bridge. Thus, a listen-only port simply monitors the conference and cannot participate in the conversation.

Included in the conference processing program is an algorithm which keeps track of the current activity state, state count, and other variables of each port to establish priority levels. The program uses this algorithm once each base program cycle to update the activity state and priority level of each port.

Figure 6:
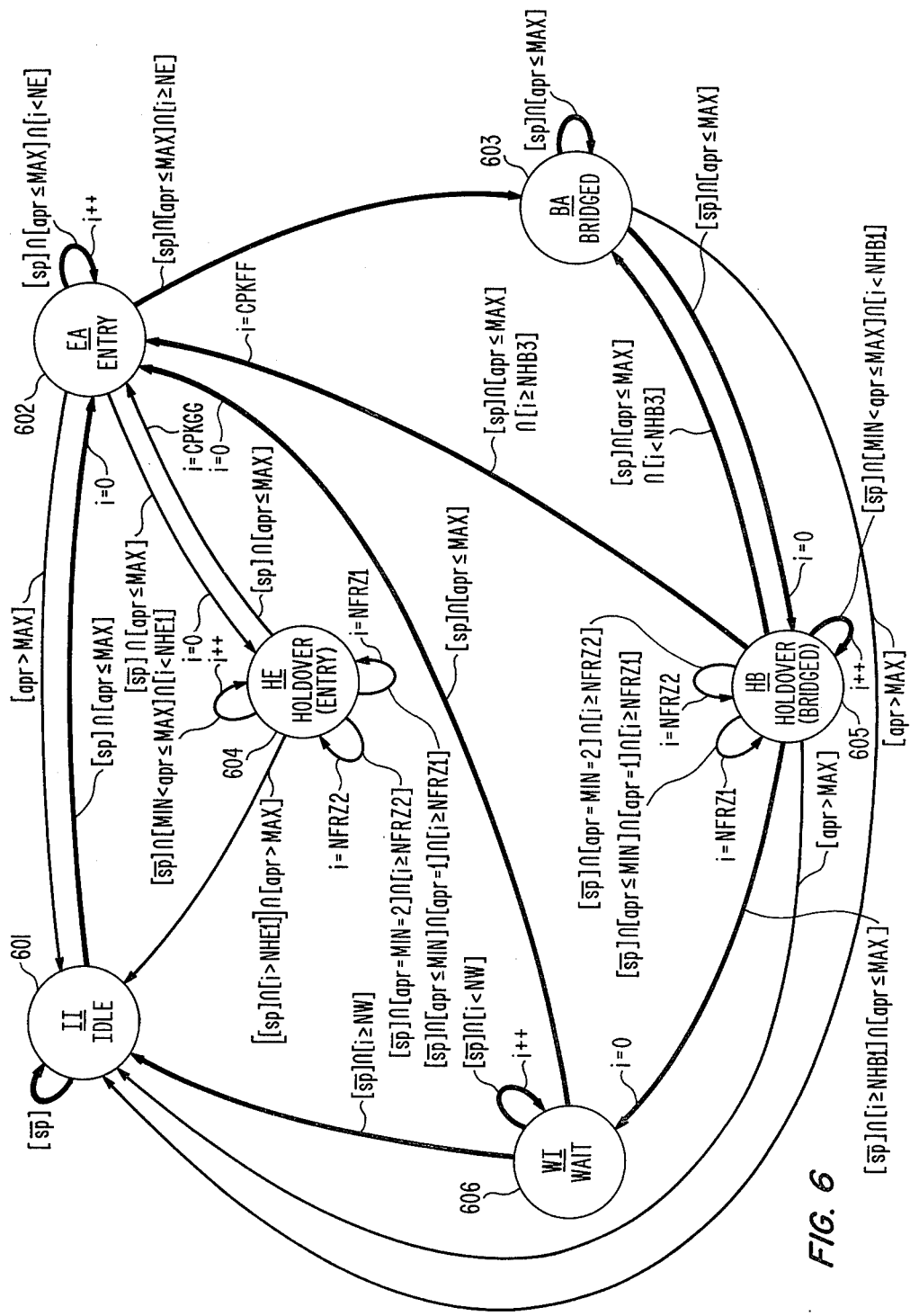
FIG. 6 shows a detailed state diagram of the conference processing algorithm for keeping track of the state of each port of a conference.

A detailed state diagram for the conference processing algorithm is depicted in FIG. 6. As shown, the diagram includes six states and all the possible state transitions. The bold transition paths represent the more common transitions made in normal program operation, whereas the lighter paths represent special cases. Inactive ports are normally in the "idle" (II) state 601. When a conferee starts talking, the active port is first placed in the "entry" (EA) state 602 and enabled on the bridge. If the conferee continues talking for an entry period, such as, for example, one second, the port is placed in the "bridged" (BA) state 603, and automatic level control is performed. If a port in the entry state becomes inactive, it is placed in a "short holdover" (HE) state 604 for a short holdover period, such as, for example, 20 to 200 milliseconds, and then placed back in the idle state. The entry state period helps prevent the automatic level control in the bridged state from adjusting to noises, such as paper rustling, breathing, etc. Whereas, the short holdover state period reduces the amount of noise heard on the bridge.

A "long holdover" (HB) state 605, as well as the short holdover state, keeps the port enabled between words and sentences depending on the length of the holdover period. This reduces speech clipping caused by constantly enabling and disabling a port from the bridge. The long holdover state which is entered from the bridged state, is much longer than the short holdover period entered from the entry state. For example, this long holdover period may last for one second.

The automatic level control performed in the bridged state reduces the speech level contrast of different conferees. The speech detector for each port not only provides speech detection, but estimates the level of speech on the port. The audio bridge processor reads the speech level from each speech level register every base cycle and controls the rate of change of the level adjustment. These level adjustments are generated as coefficients which are written into the coefficient memory of the switching hardware to implement the adjustments.

"Wait" (WI) state 606 is an intermediate state between the long holdover and idle states. When a port that was previously active leaves the long holdover state, the port is placed in the wait state rather than the idle state. Ports in the wait state are not enabled on the bridge. The only purpose of the wait state is to allow ports that have a recent history of speech, priority over ports that are in the idle state. A port will move to the idle state after a period called the wait period, such as, for example, 30 seconds. It is thought that in most large conferences, only a few conferees do most of the talking. Therefore, in the event that many ports become active at the same time, the active ports in the wait state, rather than the idle state, may be considered the best ports to be enabled.

As mentioned, to ensure stability, the conference processing algorithm limits the number of active ports (simultaneous speakers) enabled on the bridge. The maximum number of simultaneous speakers (MAX) is a parameter that may range, for example, from one to five. The larger the number, the more transparent the bridge is to the conferees, and the less chance of speech clipping. The disadvantage of a large number of simultaneous speakers is that as the number increases, the overall noise level on the bridge also increases. As shown in FIG. 6, the MAX parameter is used by the conference processing algorithm to make state transitions.

In addition, the conference processing algorithm always enables a minimum number of ports on the bridge. This minimum number (MIN) may vary, for example, from zero to two. When zero, no noise is heard on the bridge when all of the ports in a conference are inactive. This is annoying to the conferees who are using handset telephones as the conferee has the feeling that he is cut off from whom he is talking to. When MIN equals one, the last port which was active is left in a holdover state until some port becomes active. Therefore, everyone hears noise from the active port except the active port, who hears nothing. When MIN equals two, the last two active ports are left in the holdover states where all ports hear some noise. An advantage for having a large number for MIN is that the last active ports are often the most probable ports to be active again. Hence, there is less chance of speech clipping. However, the disadvantage is that the total amount of noise always heard on the bridge is greater.

During each base cycle of the program, the state of each port is updated. Shown in FIG. 6, next to the state transition paths, is a set of conditions which cause a transition. In some cases, the transition is from one state to another. In others, the port remains in the same state as indicated by the transitions paths looping back on the same state. The variable "i" on the transition paths represents the state count which is either incremented (++) or set to a designated constant. The state count for each port is stored in a 64-word block of data memory 303. The variables "sp" and "$\overline{sp}$" represent the presence and absence of speech on the port, respectively, as indicated by the speech detector and are stored in the speech level table stored in data memory 303. The "adjusted priority rank" is represented by the variable "apr" and will be discussed later. By way of example, a transition from the idle to the entry state occurs when there is speech on the port and the adjusted priority rank of the port is less than or equal to the maximum number of permitted simultaneous speakers. This transition also causes the state count to be initialized or set to zero.

SOFTWARE IMPLEMENTATION

The program implements the state diagram depicted in FIG. 6 by assigning each port an "adjusted priority level" (apl). The larger the adjusted priority level, the higher the port priority and the more likely the port is to be enabled on the bridge. The adjusted priority level is the sum total of the priority constants attributed to the current activity state of the port, including the speech-/no-speech indication the assigned port priority, and the speech level estimate. Ports in a conference with the largest adjusted priority levels are enabled on the bridge. In the embodiment, the five ports in a conference with the largest adjusted priority levels are assigned at an "adjusted priority rank" of one through five. The highest priority port has an adjusted priority rank of one, the second highest priority port having an adjusted priority rank of two, etc. If a conference has a port with broadcast priority, the broadcast port will always have an adjusted priority rank of one. The adjusted priority rank is shown in the state diagram of FIG. 6 as the variable "apr".

CONFERENCE PROCESSING PROGRAM OPERATION

Figure 7:
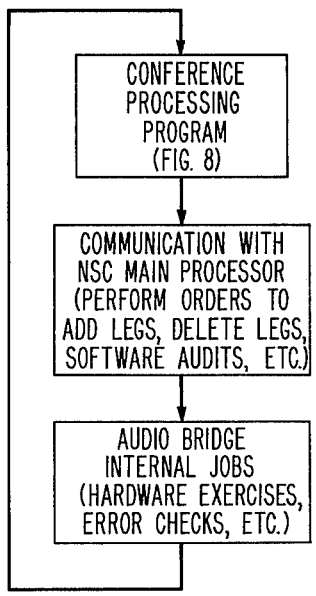
FIG. 7 shows a flow diagram of one base cycle of the audio bridge operational software.

The conference processing program is part of the operational software in the audio bridge processor which is shown in FIG. 7. One base cycle of the operational software may take, for example, two to three millisecond to complete.

Figure 8:
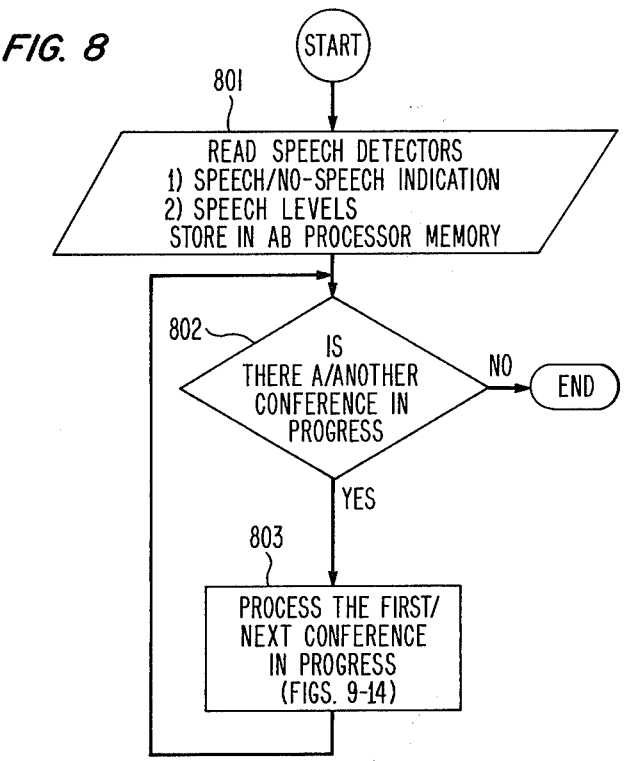
FIG. 8 through 14 shows a detailed flow diagram of one base cycle of the conference processing program which implements the conference processing algorithm.

As mentioned, the conference processing program implements the conference processing algorithm by assigning an adjusted priority level to each port. One base cycle of the conference processing program is depicted in the flow diagrams of FIGS. 8 through 14. As shown in block 801 of FIG. 8, each of the 64 port speech detectors is read byphe audio bridge processor, and the speech level estimate and speech/no-speech indication from each port are written into a speech level table in data memory 303. In blocks 802 and 803, each conference on the audio bridge is then processed independently and sequentially.

Figure 9:
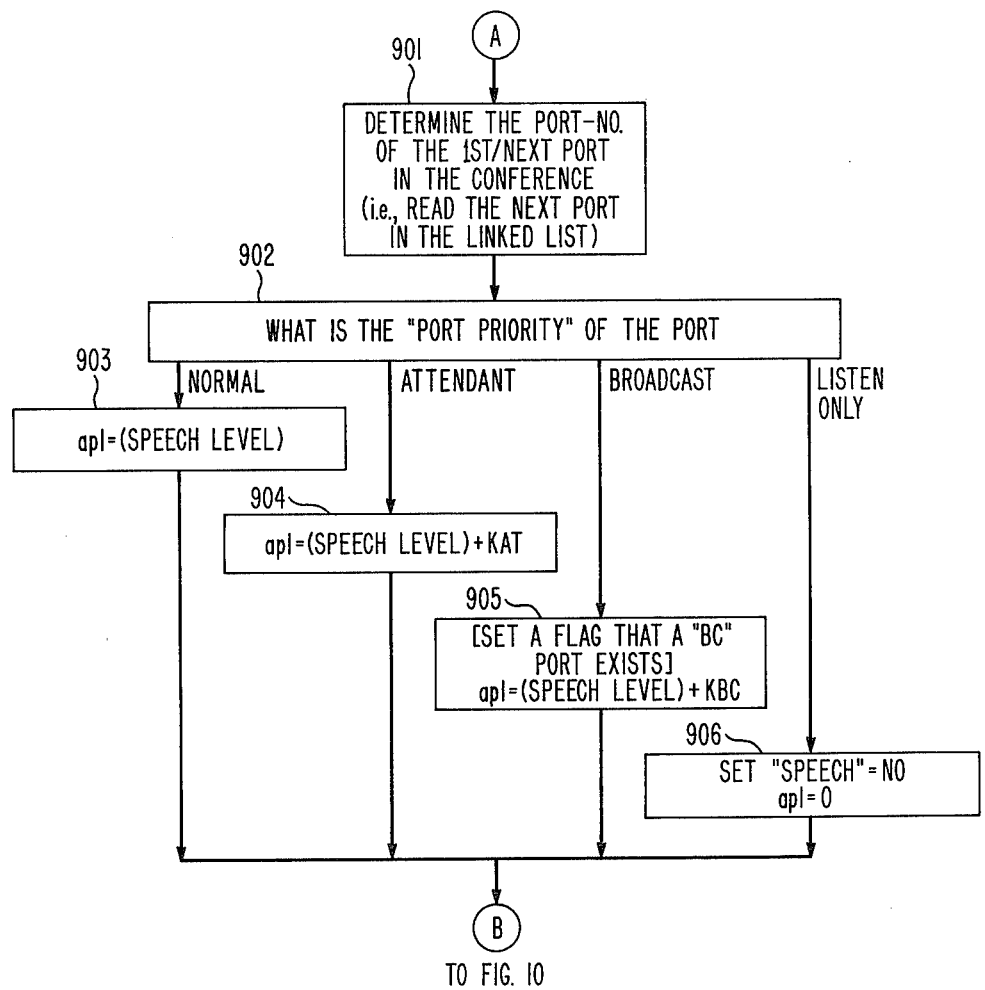
Figure 10:
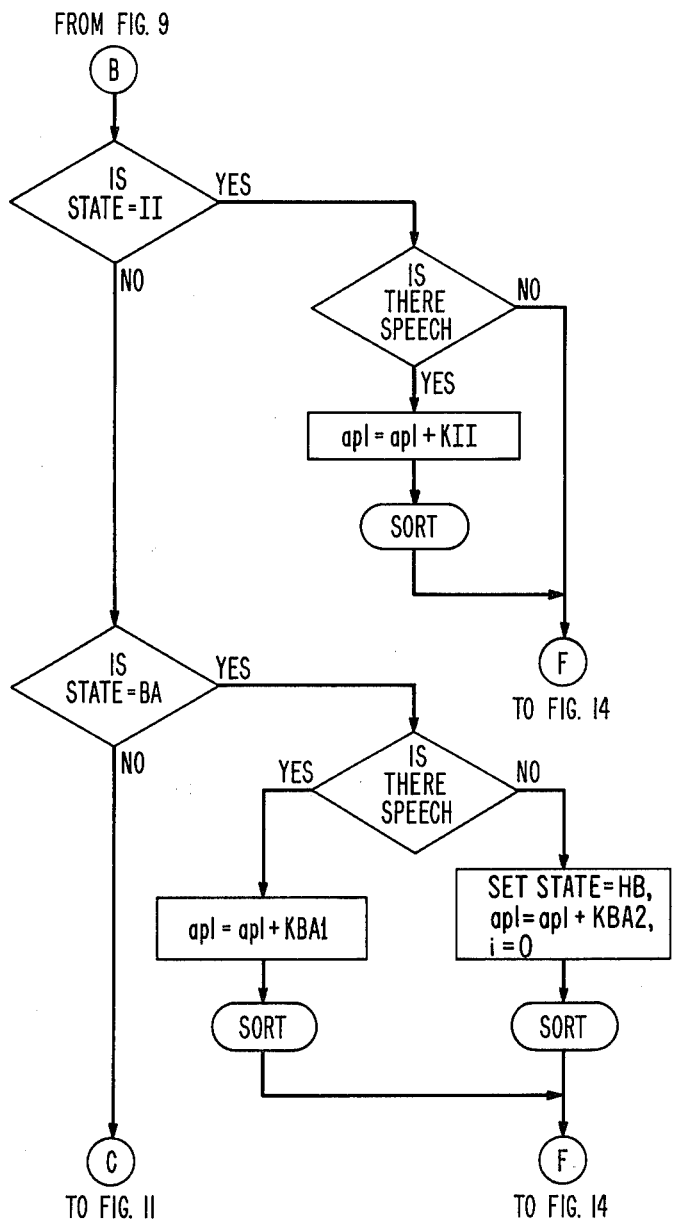
Figure 11:
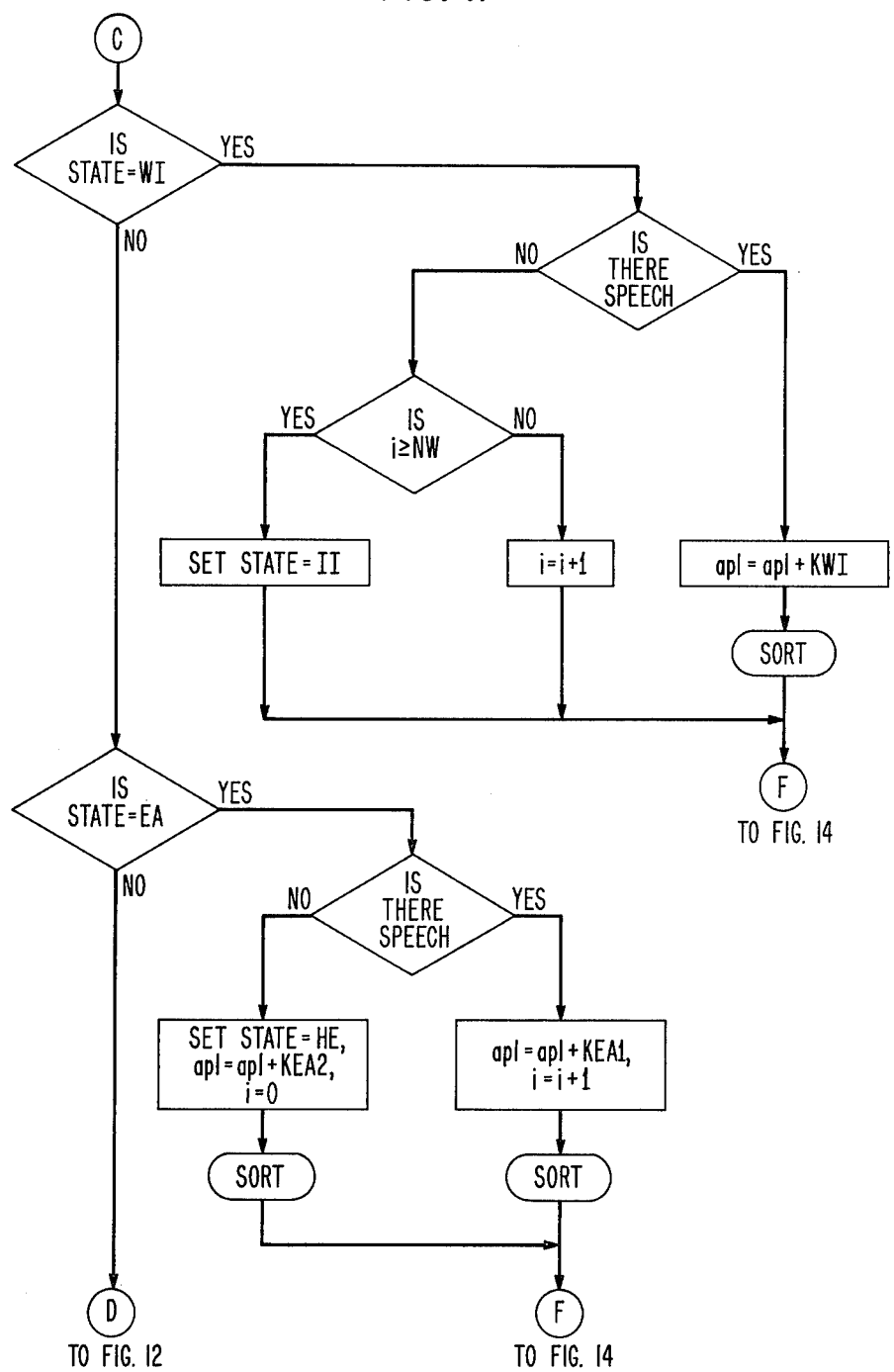
Figure 12:
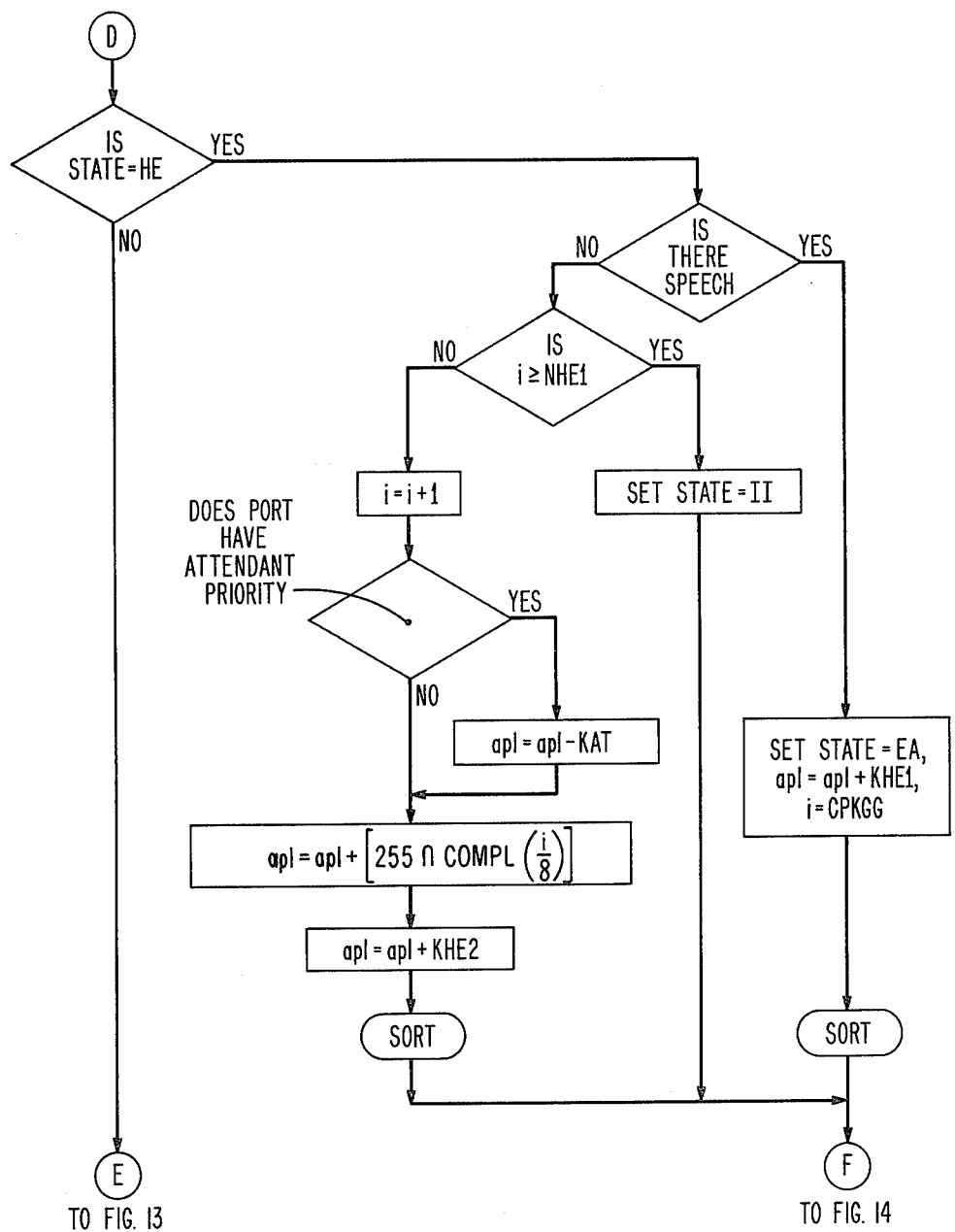
Figure 13:
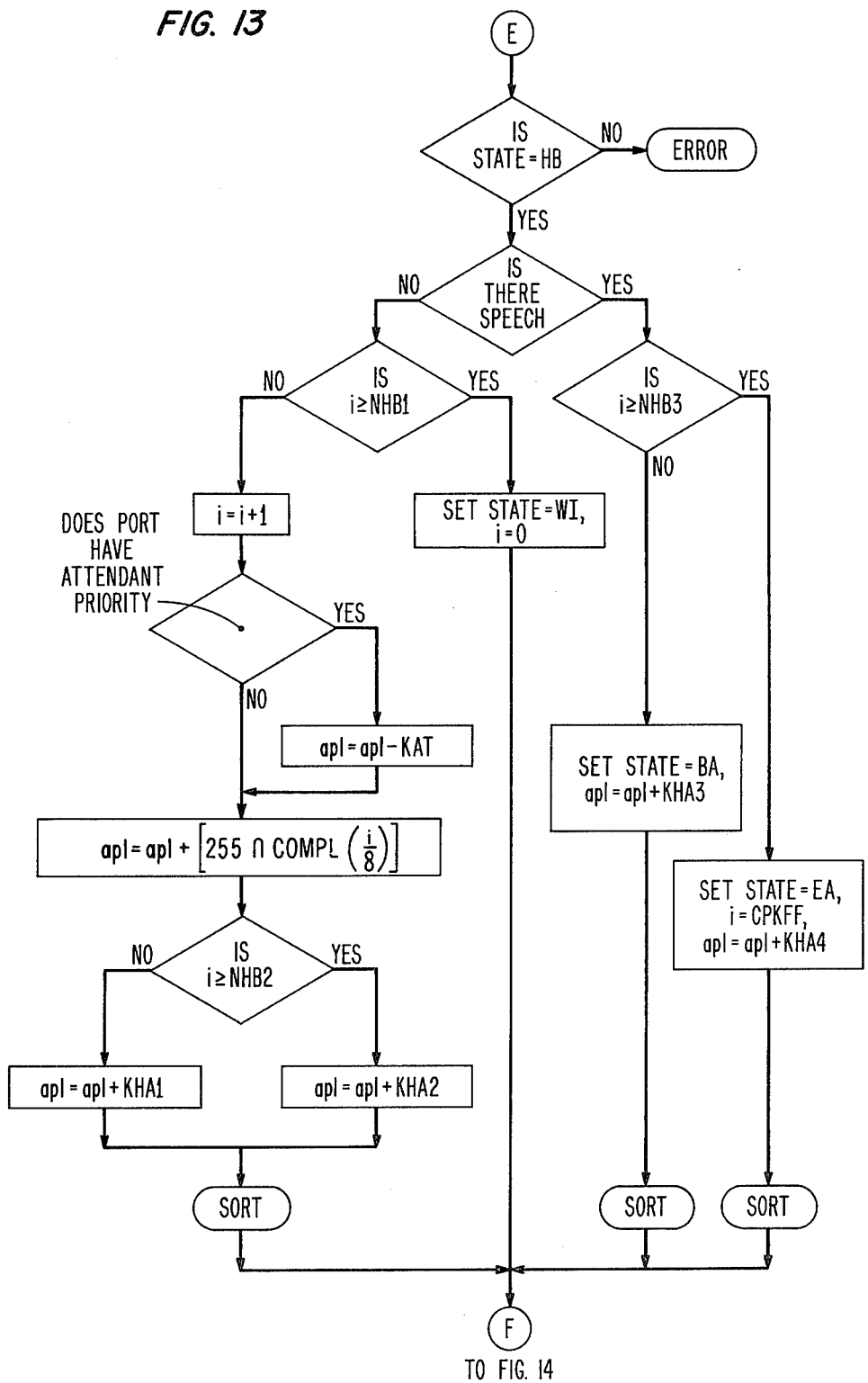
Figures 15, 17:
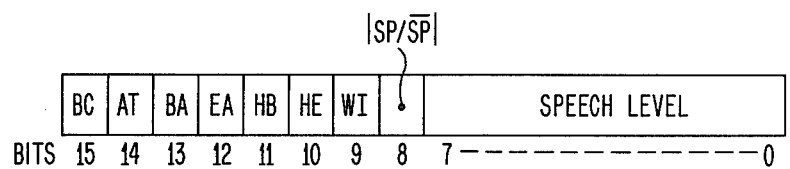
FIG. 15 shows the layout of a 16-bit word representing exemplary constants that may used to establish the adjusted priority level of a conference port.
FIG. 17 shows the layout of the conference sort array used to enable ports on the bridge.

Turning to block 901 of FIG. 9, processing for a conference begins by finding the beginning of a linked list of port numbers associated with the conference in data memory 303. Each port in the conference is then processed to obtain the adjusted priority level (apl) for the port in the following manner: first, the eight-bit speech level estimate (measurement) is read from the speech level table stored in data memory 303 and placed in a general register of arithmetic logic unit 301. This 16 bit general register contains the adjusted priority level of the port during processing. The layout of a 16-bit word representing exemplary priority constants that may be used to establish the adjusted priority level of a port is shown in FIG. 15. The current state of the port and the assigned port priority are looked up in two 64-word tables in data memory 303. As shown in blocks 903 through 906 of FIG. 9, a different constant is added to the adjusted priority level depending on the assigned port priority. For listen-only ports, the adjusted priority level along with the speech/no-speech indication are set to zero.

In FIGS. 10 through 13, additional constants are added to the adjusted priority level depending on the current state, the speech/no-speech indication, and the state count. It is here that the different states are given their relative priorities with respect to other current activity states, speech levels, and assigned port priorities. Also, the state and state-count are updated for those indicated cases. After these processing steps, the adjusted priority level of the port is equal to the sum total of the speech level, the state/state-count constant, and the assigned priority constant.

Figure 16:
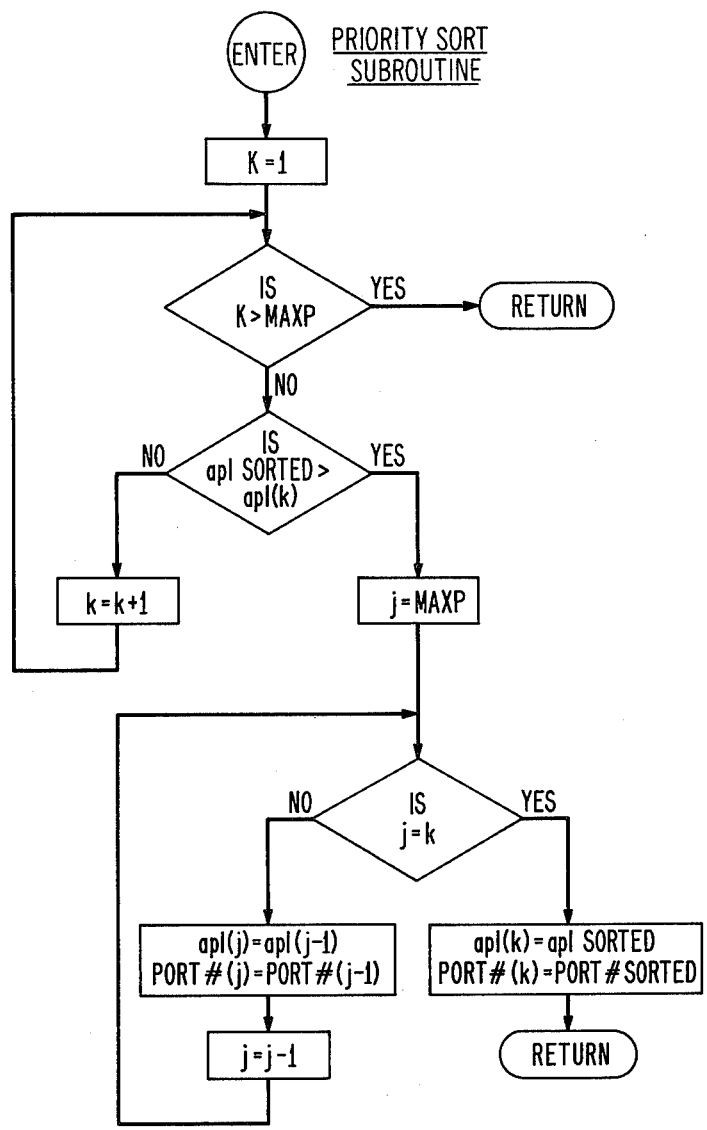
FIG. 16 shows a detailed flow diagram of the priority SORT subroutine.

Finally, unless the port is inactive and either in the idle or wait state, a priority sort subroutine is called which is depicted in the flow diagram of FIG. 16. The priority sort subroutine is a well-known sort by insertion sorting routine that inserts the adjusted priority level and port number of a port in a conference sort array such that the port with the largest adjusted priority level is at the top of the sort array, and the port with the smallest adjusted priority level is at the bottom. Note that the minimum number of ports that may be sorted in each conference is the minimum number of ports always enabled on the bridge (MIN). The maximum number of ports that may be sorted is the actual number of ports (MAXP) in the conference. The conference sort array is depicted in FIG. 17 and is stored in data memory 303 of the audio bridge processor.

Figure 14:
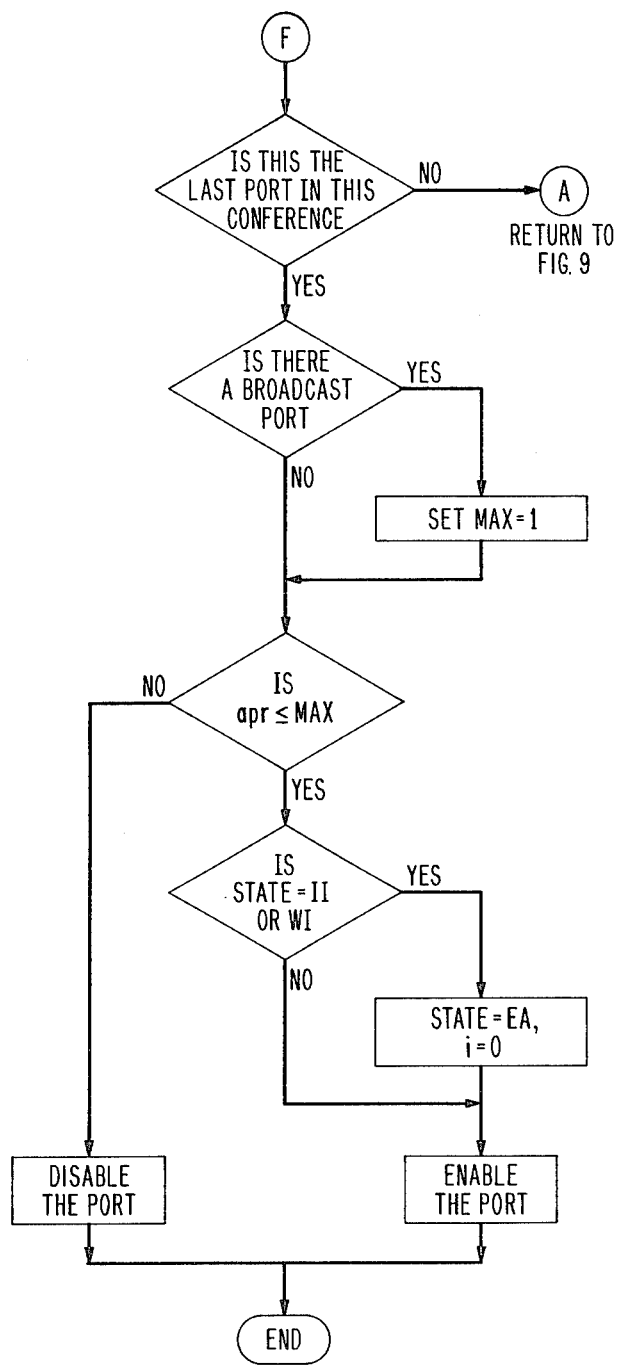

After all the ports in a particular conference have been processed, the ports in the sort array that have the highest adjusted priority rank are enabled on the bridge as shown in FIG. 14. During this end of conference processing, the number of simultaneous speakers is limited to the value of MAX. Depending on the value of MIN, zero, one, or two ports are enabled on the bridge. If one of these ports is in a holdover state, the state count for that port is written to a specific constant so that state count does not increment. Thereafter, the port will stay in the holdover state until some other port becomes active. Then normal incrementing of the state count will cause the port to go either to the idle or wait state.

After this conference has been processed, the program will continue to process any other conferences during each base cycle of the bridge.

In summary, the conference processing program rank orders the adjusted priority level of each port to determine which conferee ports in a conference are enabled on the bridge. To ensure the stability of the bridge, only a limited number of simultaneous speakers are enabled on the bridge and heard by the conferees. The priority level of each port is a function of several pluralities or sets of states, such as, for example, the levels of speech on the port, the current port activity as well as the number of base cycles the port has remained in that activity, and an assigned port priority. As suggested, two or more other sets of states devised by one skilled in the art may be used.

In this illustrative embodiment, the presence and levels of speech are determined by a speech detector for each port. The conference processing program then uses the presence of speech to update the current activity or "activity state" of each port. Each activity state is asisigned a different priority level of each port. In addition, the state count—the number of base cycles a port remains in a given activity state—is used to adjust the port priority level. Another factor in adjusting the port priority level is the port priority constant assigned by the NSC processor. All of these weighted factors are combined to form an overall priority level for each port. One set of port priority constants assigned to each state was shown in FIG. 15. After the conference processing program determines the overall priority level for each port, the levels are sorted to establish a rank order. The ports with the highest rank order are then enabled on the bridge for that base cycle. Of course, some other rank order, such as the lowest or another devised by one skilled in the art, may be used depending on the assigned priority constants.

It is to be understood that the above-described method and apparatus is merely an illustrative embodiment of the principles of this invention and that numerous other methods and arrangements may be devised by those skilled in the art without departing from the spirit and scope of the invention. In particular, one skilled in the art may easily assign different priority constants to each state and establish an alternative rank order scheme for those constants to enable ports on the bridge.

What is claimed is:

1. In a multiport digital conference arrangement wherein information samples from selected ports are included in an output sample and wherein each port can assume a first and a second plurality of states, a method for selecting ports; comprising the steps of:
   detecting the state of each port in said first plurality of states;
   detecting the state of each port in said second plurality of states;
   assigning a priority level to each port based on the detected states of the port; and
   including in said output sample the information samples of only the ports having predetermined priority levels.

2. In a multiport digital conference arrangement wherein information samples received from selected ports are included in an output sample and wherein each port can assume a first and a second plurality of states, a method for selecting ports; comprising the steps of:
   detecting the state of each port in said first plurality of states;
   ascertaining the period of time each port has been in the detected state of said first plurality;
   detecting the state of each port in said second plurality of states;
   assigning a priority level to each port based on the detected states of the port and the period of time the port has been in the detected state of said first plurality; and
   including in said output sample the information samples of only the ports having predetermined priority levels.

3. The method set forth in claim 2 further including the step of ascertaining the period of time each port has been in the detected state of said second plurality and assigning the priority level to each port based on the period of time the port has been in the detected state of said second plurality.

4. The method set forth in claim 2 wherein the second plurality of states comprises the levels of sound on the port as represented by the corresponding information sample.

5. The method set forth in claim 2 or 4 wherein the first plurality of states comprises the current activity status of the port.

6. The method set forth in claim 5 wherein the step of assigning the priority level includes ranking the priority level of the ports and wherein the step of including information samples includes information samples of only the highest priority levels.

7. The method set forth in claim 6 wherein the first plurality of states further comprises the busy/idle status of the port.

8. The method set forth in claim 7 wherein said period of time comprises the state-count of the port.

9. In a multiport digital conference arrangement wherein data samples representing audio information on selected ports are combined for distribution to the ports, a method for selecting ports; comprising the steps of:
   establishing a first rank order of priority among the ports based on the energy level measured on each port as represented by the corresponding data sample,
   establishing a second rank order of priority among the ports based on the busy/idle status of each port,
   establishing a third rank order of priority among the ports based on the interval of time a port is idle,
   arranging the order of the ports per a predetermined algorithm, and
   combining the data samples of particular ports selected according to said last named order.

10. In a multiport digital conference arrangement wherein data samples representing audio information on selected ports are combined for distribution to the ports, a method for selecting ports; comprising the steps of:
    establishing a first rank order of priority among the ports based on the energy level measured on each port as represented by the corresponding data sample,
    establishing a second rank order or priority among the ports based on the busy/idle status of each port,
    establishing a third rank order of priority among the ports based on the interval of time a port is busy,
    arranging the order of the ports in accordance with the first, second, and third ranks of priority, and
    combining the data samples of particular ports selected according to said order.

11. In a multiport digital conference arrangement wherein information samples from selected ports are included in an output sample for distribution to the ports and wherein each port can assume a first and a second plurality of states, apparatus for selecting ports; comprising:
    means for detecting the state of each port in said first plurality;
    means for detecting the state of each port in said second plurality;
    means for assigning a priority level to each port based on the detected states of the port; and
    means for including in said output sample the information samples of only the ports having predetermined priority levels.

12. In a multi-port digital conference arrangement wherein information samples from selected ports are included in an output sample for distribution to the ports and wherein each port can assume a first and a second plurality of states, apparatus for selecting ports; comprising:
    means for detecting the state of each port in said first plurality;
    means for ascertaining the period of time each port has been in the detected state of said first plurality;
    means for detecting the state of port in said second plurality;
    means for assigning a priority level to each port based on the detected states of the port and the period of time the port has been in the state of said first plurality; and
    means for including in said output sample the information samples of only the ports having predetermined priority levels.

13. Apparatus in accordance with claim 11 or 12 in which said apparatus further comprises means for ascertaining the period of time each port remains in the detected state of said second plurality and said means for assigning a priority level assigns a priority level to each port based on the period of time the port remains in the detected state of said second plurality.

* * * * *